United States Patent
Tsirkin et al.

(10) Patent No.: US 9,569,247 B2
(45) Date of Patent: Feb. 14, 2017

(54) RANGE BASED VIRTUAL MACHINE FUNCTIONS

(71) Applicant: Red Hat Israel, Ltd., Ra'anana (IL)

(72) Inventors: Michael Tsirkin, Raanana (IL); Paolo Bonzini, Milan (IT)

(73) Assignee: Red Hat Israel, Ltd., Ra'Anana (IL)

( * ) Notice: Subject to any disclaimer, the term of this patent is extended or adjusted under 35 U.S.C. 154(b) by 119 days.

(21) Appl. No.: 14/674,440

(22) Filed: Mar. 31, 2015

(65) Prior Publication Data

US 2016/0291996 A1   Oct. 6, 2016

(51) Int. Cl.
*G06F 9/455* (2006.01)
*G06F 12/10* (2016.01)

(52) U.S. Cl.
CPC ....... *G06F 9/45558* (2013.01); *G06F 12/1009* (2013.01); *G06F 2009/45579* (2013.01); *G06F 2009/45583* (2013.01); *G06F 2212/657* (2013.01)

(58) Field of Classification Search
CPC .............. G06F 9/45558; G06F 12/1009; G06F 2009/45583
See application file for complete search history.

(56) References Cited

U.S. PATENT DOCUMENTS

| | | |
|---|---|---|
| 7,900,017 B2 | 3/2011 | Hall et al. |
| 8,645,665 B1 | 2/2014 | Bennett et al. |
| 2013/0091568 A1* | 4/2013 | Sharif ............ G06F 21/50 726/22 |
| 2013/0117743 A1* | 5/2013 | Neiger ............ G06F 9/455 718/1 |
| 2013/0191611 A1* | 7/2013 | Liu ............ G06F 12/1009 711/206 |
| 2013/0276057 A1 | 10/2013 | Smith et al. |
| 2014/0006746 A1 | 1/2014 | Hildesheim et al. |
| 2014/0173169 A1* | 6/2014 | Liu ............ G06F 12/1009 711/6 |
| 2014/0173628 A1 | 6/2014 | Ramakrishnan et al. |
| 2014/0189194 A1 | 7/2014 | Sahita et al. |
| 2014/0282514 A1 | 9/2014 | Carson et al. |
| 2014/0380009 A1* | 12/2014 | Lemay ............ G06F 12/145 711/163 |

(Continued)

OTHER PUBLICATIONS

Sharif et al. "Secure In-VM Monitoring Using Hardware Virtualization." Nov. 2009. ACM. CCS'09. pp. 477-487.*

(Continued)

*Primary Examiner* — Nathan Sadler
(74) *Attorney, Agent, or Firm* — Haynes and Boone, LLP

(57) ABSTRACT

A method performed by a physical computing system includes, with a hypervisor, determining that a multilevel guest page table includes an upper directory that maps a set of contiguous entries to privileged pages, with the hypervisor, determining that, within the multilevel page table, only the set of contiguous entries map to the privileged pages, with the hypervisor, receiving a request from the guest to execute a virtual machine function, receiving a pointer as a parameter for the virtual machine function, and in response to determining that the pointer references a memory address that is within a range associated with the set of contiguous entries, aborting the virtual machine function.

20 Claims, 5 Drawing Sheets

(56) References Cited

U.S. PATENT DOCUMENTS

| | | | | |
|---|---|---|---|---|
| 2016/0048464 | A1* | 2/2016 | Nakajima | G06F 12/1475 711/152 |
| 2016/0179665 | A1* | 6/2016 | LeMay | G06F 12/08 711/154 |
| 2016/0179696 | A1* | 6/2016 | Zmudzinski | G06F 12/1009 711/163 |
| 2016/0188492 | A1* | 6/2016 | Bachwani | G06F 12/10 711/6 |
| 2016/0203088 | A1* | 7/2016 | Tsirkin | G06F 12/1483 711/6 |
| 2016/0224362 | A1* | 8/2016 | Tsirkin | G06F 9/45558 |
| 2016/0224383 | A1* | 8/2016 | Bonzini | G06F 9/5016 |
| 2016/0224484 | A1* | 8/2016 | Bonzini | G06F 13/32 |
| 2016/0232020 | A1* | 8/2016 | Tsirkin | G06F 9/45545 |
| 2016/0239324 | A1* | 8/2016 | Tsirkin | G06F 9/45558 |
| 2016/0253110 | A1* | 9/2016 | Tsirkin | G06F 3/0619 |

OTHER PUBLICATIONS

Grace et al. "Transparent Protection of Commodity OS Kernels Using Hardware Virtualization." Sep. 2010. https://www.comp.nus.edu.sg/~liangzk/papers/securecomm10.pdf.*

Fu et al. "Space Traveling across VM: Automatically Bridging the Semantic Gap in Virtual Machine Introspection via Online Kernel Data Redirection." May 2012. IEEE. SP 2012. pp. 586-600.*

Willems et al. "CXPInspector: Hypervisor-Based, Hardware-Assisted System Monitoring." Nov. 2012. Ruhr-Universitat Bochum. Technical Report TR-HGI-2012-002.*

Nakajima et al. "Extending KVM Models Toward High-Performance NFV." Oct. 2014. http://www.linuxkvm.org/images/1/1d/01x05-NFV.pdf.*

Anababa. "How to Implement a software-based SMEP(Supervisor Mode Execution Protection) with Virtualization/Hypervisor Technology." Nov. 2014. http://hyperysir.blogspot.com/2014/11/how-to-implement-software-based.html.*

Intel 64 and IA-32 Architectures Software Developers Manual. Jun. 2016. vol. 3C. http://www.intel.com/content/dam/www/public/us/en/documents/manuals/64-ia-32-architectures-software-developer-manual-325462.pdf. vol. 3C. pp. 25-11 to 25-17.*

Steve Maresca, *VM Security*, http://www.kiayias.com/compsec/CSE4707_Computer_Security/Reading_files/VM-security.pdf

[*Qemu-Devel*] [*RFC*] *Next Gen KVM API*, Feb. 2012, http://qemu.11.n7.nabble.com/Qemu-devel-RFC-Next-gen-kvm-api-td159448i60.html.

* cited by examiner

RANGE BASED VIRTUAL MACHINE FUNCTIONS

BACKGROUND

The present disclosure relates generally to virtual machine management, and more particularly to virtual machine functions.

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

SUMMARY

According to one example, a method performed by a physical computing system includes, with a hypervisor, determining that a multilevel guest page table includes an upper directory that maps a set of contiguous entries to privileged pages, with the hypervisor, determining that, within the multilevel page table, only the set of contiguous entries map to the privileged pages, with the hypervisor, receiving a request from the guest to execute a virtual machine function, receiving a pointer as a parameter for the virtual machine function, and in response to determining that the pointer references a memory address that is within a range associated with the set of contiguous entries, aborting the virtual machine function.

According to one example, a method performed by a computing system includes creating a multilevel guest page table that maps guest virtual addresses to guest physical addresses, mapping guest pages to a contiguous set of entries in a Page Upper Directory (PUD) of the multilevel page table, mapping privileged pages to other entries within the PUD, executing a virtual machine function that passes a pointer as a parameter, comparing the pointer to a range of memory addresses associated with the contiguous set of entries, and in response to determining that the pointer references a memory address that is outside the range, aborting the virtual machine function.

According to one example, a system includes a processor and memory comprising machine readable instructions that comprise a hypervisor configured to manage a number of guests, wherein the hypervisor is configured to: determine that a multilevel guest page table includes an upper directory that maps a set of contiguous entries to privileged pages from a perspective of the guest, determine that, within the multilevel page table, only the set of contiguous entries map to the privileged pages, receive a request from the guest to execute a virtual machine function, the virtual machine function passing a pointer as a parameter, compare a memory address referenced by the pointer to a range of memory addresses associated with the set of contiguous entries, and in response to determining that the pointer references a memory address that is inside the range, abort the virtual machine function.

Figure 1:
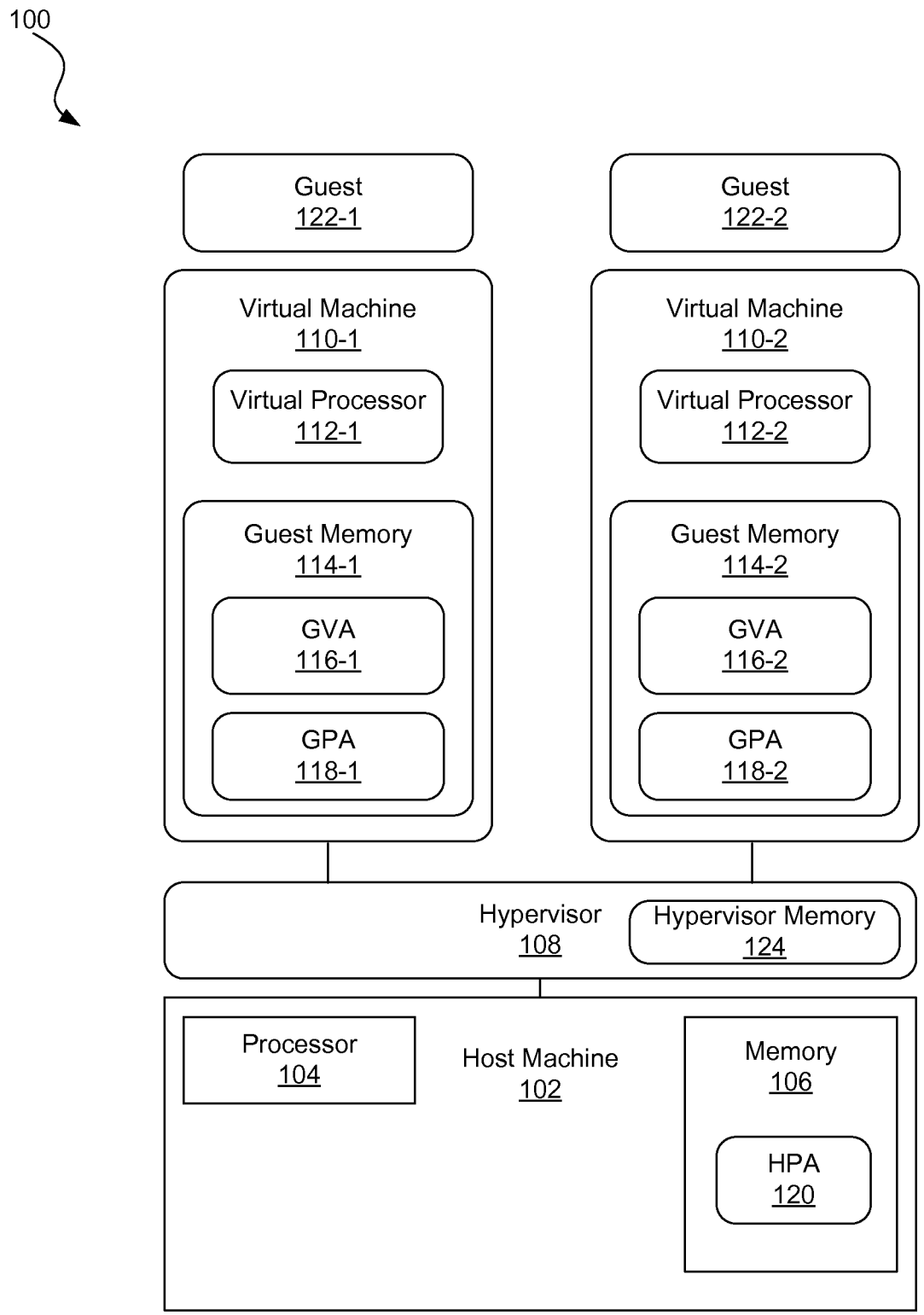
FIG. 1 is a diagram showing illustrative virtual machines running on a host machine, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a host machine may run several virtual machines. The processor for such a host machine switches to different contexts based on the virtual machine that is currently being executed. For example, when a processor switches to a particular virtual machine, it is referred to as a virtual machine entry. When the processor switches to a different context, such as to that of another virtual machine or to that of the hypervisor, it is referred to as a virtual machine exit. Switching contexts involves some overhead and thus it is desirable to minimize the switching of contexts.

The Instruction Set Architecture (ISA) for some processors includes an instruction referred to as VMFUNC. The VMFUNC instruction can be used to provide a number of useful operations such as allowing communication between different virtual machines or communication between a virtual machine and the hypervisor without causing an exit. This is done by giving the guest running on a virtual machine access to a privileged page of memory. The page may be privileged because it is part of hypervisor memory or guest memory for a different virtual machine. Typically, a guest does not have write access to such pages for security purposes. But, use of the VMFUNC, along with various other security measures, can allow such write access in a secure manner. Using such write access, data can be transferred from the guest memory to guest memory of another virtual machine (privileged memory). Or, data can be transferred from the guest memory of another virtual machine (privileged memory) to guest memory of the current virtual machine.

An operation that uses the VMFUNC instruction, or similar processor instruction, is referred to as a virtual machine function. Virtual machine functions sometimes accept a pointer as a parameter. For example, in the case where the virtual machine function copies data from guest memory to privileged memory, the virtual machine function receives a pointer that indicates the location of the data within guest memory that is to be copied. It is important that the virtual address referenced by the pointer maps to an address that is actually within guest memory. Likewise, a virtual machine function that copies data from privileged memory to guest memory also receives a pointer as a parameter. The pointer indicates the location within guest memory where data is to be stored. Again, it is important to ensure that the pointer references a virtual address that maps to a memory address that is within guest memory. Otherwise, data within privileged memory could be overwritten. To validate that the pointer points to an appropriate location typically requires a page walk. A page walk consumes a lot of computing resources and thus it is desirable to avoid such a scenario.

According to principles described herein, an efficient method of validating pointers is used. Specifically, a multi-level guest page table that maps guest virtual addresses to guest physical addresses is used. The highest level of the multilevel page table, which will be referred to as the page upper directory, has a contiguous set of one or more entries that map virtual addresses to privileged memory locations. No other entries within the page upper directory map to privileged memory locations. Using such a page table, the virtual machine function can perform a simple operation to determine if the pointer is within the desired range. Specifically, if the pointer has a value within the range associated with privileged memory, then the virtual machine function can be aborted because data should not be retrieved from or written from privileged memory. But, if the pointer has value outside the range of addresses associated with the privileged memory, then it is known that such a pointer is valid and the virtual machine function can continue.

In some examples, the logic can be reversed. Specifically, a set of contiguous entries within the page upper directory are mapped to guest memory. In such a case, a pointer is valid if it falls within the range of addresses associated with the set of contiguous entries.

FIG. 1 is a diagram showing illustrative system 100 of virtual machines 110 running on a host machine 102. According to the present example, a physical system, such as a host machine 102 uses a hypervisor 108 to manage multiple virtual machines 110. Each of the virtual machines 110 provides virtual resources, such as a virtual processor 112 and virtual memory (guest memory) 114 to a guest operating system 122.

The host machine 102 includes hardware such as a processor 104 for executing software (e.g., machine readable instructions) and using or updating data stored in memory 106. The processor 104 may represent one or more processors acting in concert. The memory 106 may be one or more of many different types of memory. Some types of memory, such as solid state drives typically have relatively larger storage volume but relatively slower performance. Other types of memory, such as those used for Random Access Memory (RAM), are optimized for speed and are often referred to as "working memory." The various types of memory may store information in the form of software and data. The software may include an operating system, a hypervisor 108 and various other software applications.

The memory 106 may be divided into units referred to as pages. A page is a specified amount of contiguous memory that represents the smallest unit in which an operating system allocates for various purposes. A page of memory is a set range of addresses to which data can be stored. The operating system may swap pages from working memory to longer term storage such as a non-volatile storage. The pages in host memory correspond to Host Physical Addresses (HPAs) 120. The HPAs 120 may be allocated for use by the host machine 102, the hypervisor 108, or one of the virtual machines 110.

The hypervisor 108 supports a first virtual machine 110-1 having a first virtual processor 112-1 and guest memory 114-1. The hypervisor 108 also supports a second virtual machine 110-2 having a second virtual processor 112-2 and guest memory 114-2. Although two virtual machines 110 are illustrated, other examples include fewer than two virtual machines or more than two virtual machines.

The hypervisor 108 is provided with some memory referred to as hypervisor memory 124. Hypervisor memory 124 corresponds to physical pages in host memory 106. Thus, a subset of the pages in host memory 106 is allocated for use by the hypervisor. The hypervisor 108 can use this memory to perform various tasks related to management of the virtual machines 110.

In the present example, virtual machines 110 are platforms on which operating systems referred to as guest operating systems 122 run. The guest operating systems 122 may be referred to as "guests." A guest 122-1 running on the first virtual machine 110-1 may be a different operating system than another guest 122-2 running on the second virtual machine 110-2. Guests 122 may also be different operating systems than the operating system running on host machine 102.

The hypervisor 108 manages the host machine 102 resources and makes them available to one or more guests 122 that may be alternately or concurrently executed by the host machine 102. Hypervisor 108 may manage hardware resources and arbitrates requests of the multiple guests. For example, the hypervisor 108 may present a virtual set of CPU, memory, I/O, and disk resources to each guest based on the physical hardware and/or based on a standard and consistent selection of custom hardware. A virtual machine 110 is provided its own address space in memory, its own processor resource allocation, and its own device input/output (I/O) using its own virtual device drivers.

In the present example, the hypervisor 108 provides a virtual machine 110, which is an underlying emulation of host machine 102, to a guest 122. A virtual machine 110 can be, for example, a hardware emulation, full virtualization, para-virtualization, and operating system-level virtualization virtual machine. The term virtual machine generally refers to part of a host system that is visible to a guest 122. A virtual machine 110 may include, for example, virtual CPUs 112, one or more virtual devices such as an emulated NIC or disk, physical devices over which a guest 122 is given partial or full control, virtual firmware such as a Basic Input/Output System (BIOS) and/or an Extensible Firmware Interface (EFI), an Advanced Configuration and Power Interface (ACPI), virtual memory 114 (e.g., guest memory), and so forth.

In the present example, a guest 122 manages resources of the virtual machine 110. The term "guest" refers to the computer readable instructions run on a hypervisor 108 that is installed on a disk, loaded into memory, or currently running. A guest 122 may include, for example, a copy of firmware in memory, an operating system, additional installed software, a browser, applications running in a browser, and so forth. In one example, a virtual machine 110 running on a host machine 102 may run the same or a different guest operating system as the host operating system 114. Some examples of types of operating systems that may be run include LINUX, UNIX, OS X, WINDOWS, and so forth.

The guest memory 114 is represented by Guest Virtual Addresses (GVA) and Guest Physical Addresses (GPAs). The hypervisor 108 maps GPAs 118 to HPAs 120. Specifically, a page of host memory is mapped to a page of guest memory 114 identified by GPAs 118. A page table is used to maintain this mapping. Each entry in the page table provides a mapping from a GPA 118 to an HPA 120. Similarly, the guest maps pages identified by GVAs 116 to pages of GPAs 118. A page table is also used for such a mapping. The GVAs 116 are provided to various applications that run on the guest 122.

The hypervisor 108 provides multiple sets of page tables. In one example, the sets of page tables define the same mapping from HPAs to GPAs but with different access privileges. The sets of page tables, referred to as "views," define a virtual machine's privileges to the different pages in terms of execution access, write access, and read access. A guest 122 is typically not given access to pages other than those associated with the GPA pages of the corresponding virtual machine 110. For example, a guest 122 is not given access to pages in host memory 106 that are mapped to hypervisor memory 124 or GPAs 118 of a different virtual machine. For example, virtual machine 110-1 has access to HPAs 120 that are mapped to GPAs 118-1, but not HPAs 120 that are mapped to GPAs 118-2. This is because GPAs 118-2 are associated with a different virtual machine 110-2.

But, as described above, it can be useful to give a virtual machine 110 and its respective guest 122 access to a page of memory to which it would not otherwise have access. Such access can allow the virtual machine to send information to either another virtual machine or to the hypervisor without a virtual machine exit. Thus, the VMFUNC instruction provides a guest with different views, which allow access to a virtual machine function that executes a segment of trusted code. The trusted code can perform various write operations to privileged pages (i.e., pages of hypervisor memory or guest memory for a different guest).

Figure 2:
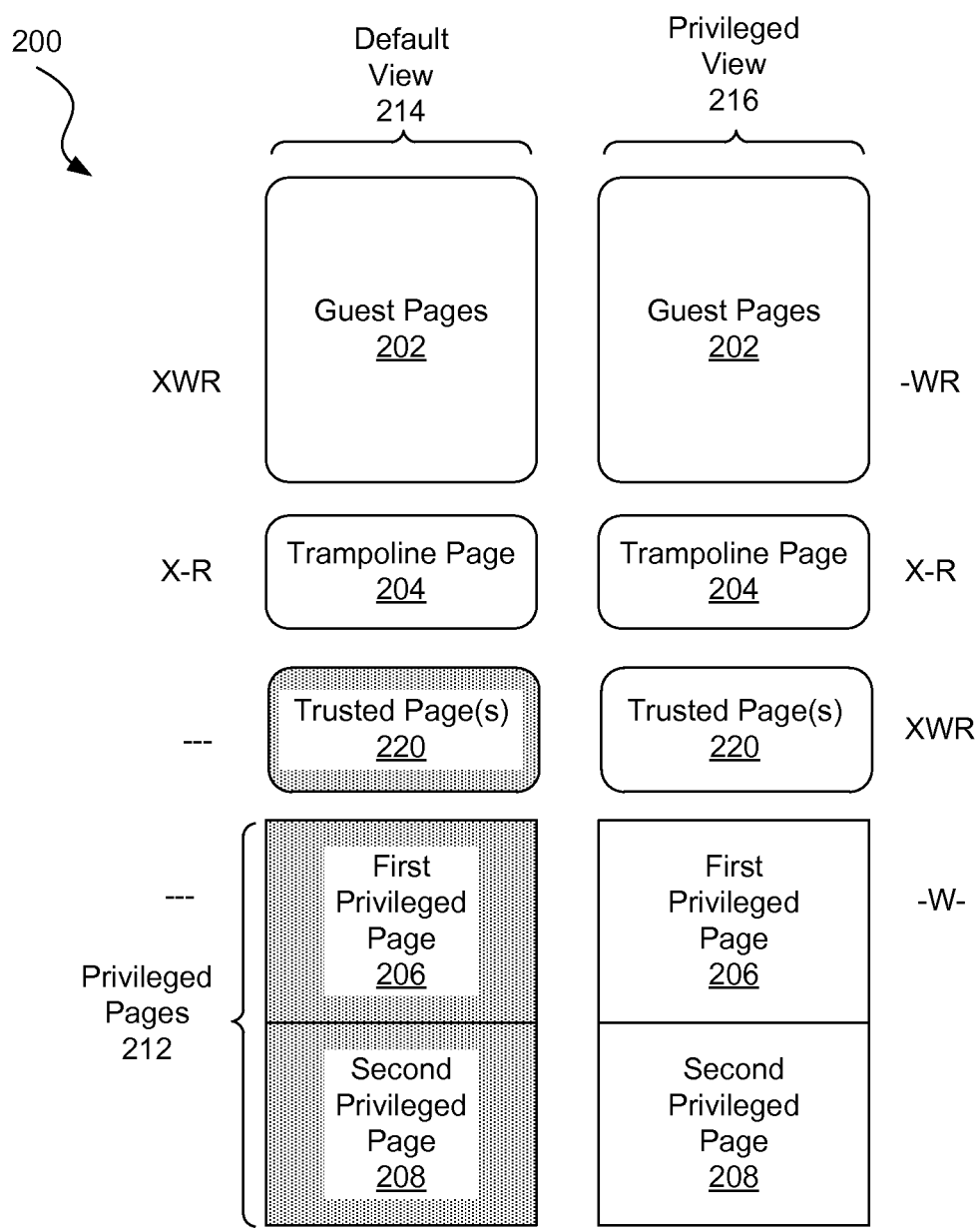
FIG. 2 is a diagram showing various page views associated with a virtual machine function, according to one example of principles described herein.

FIG. 2 is a diagram 200 showing various page views 214, 216 associated with a virtual machine function. According to the present example, the pages within host memory (e.g., 106, FIG. 1) from the perspective of a particular guest (e.g., 122-1, FIG. 1) are divided up into guest pages 202, a trampoline page 204, a trusted page 220, and privileged pages 212.

The guest pages 202 correspond to pages of guest memory (e.g. 114, FIG. 1) that have been allocated for use by the guest. The guest pages 202 may store code associated with applications run by the guest system. The guest pages 202 may also store data associated with those applications.

The trampoline page 204 typically has different access privileges than the guest pages 202. Specifically, the guest does not have write access to the trampoline page 204. The trampoline page is typically where the VMFUNC instruction is stored. For example, a method stored within the guest pages 202 may include an instruction to jump to code within the trampoline page. The VMFUNC instruction stored in the trampoline page is then executed. Then, the trampoline code includes instructions to call a method that is stored within the trusted page 220. The trusted code page 220 is a page that the guest only has access through use of the virtual machine function instructions. The trusted page 220 may include the instructions to copy data from the guest pages 202 to the privileged pages 212 or to copy data from the privileged pages 212 to the guest pages 202. In some examples, there may be multiple trusted pages 220. As will be explained in further detail below, the trusted page 220 may also include the code that determines whether a pointer parameter falls within a desired range.

The privileged pages 212 correspond to portions of memory to which the guest does not typically have access. A privileged page 212 may be a portion of hypervisor memory. Alternatively, a privileged page 212 may be a portion of guest memory for a different guest. The privileged pages 212 include a first privileged page 206 and a second privileged page 208.

The default view 214 represents the normal view provided to the guest. In this view, access to all privileged pages 212 and the trusted pages 220 is disabled. In the default view 214, the guest may have full access to the guest pages 202. Specifically, the guest has execute access to the guest pages 202, which gives the guest the ability to execute code stored within those pages. The guest also has read access to the guest pages 202, which gives the guest the ability to read data stored in the guest pages. The guest also has write access to the guest pages 202, which gives the guest the ability to write data to the guest pages.

According to principles described herein, a particular virtual machine function instruction will provide the guest with a different view, particularly, the privileged view 216. With the privileged view 216, the guest has write access to the privileged pages, including both the first privileged page 206 and the second privileged page. Write access to all other privileged pages remains disabled. In the privileged view 216, the guest has execution access to the trusted code pages 220.

Figure 3:
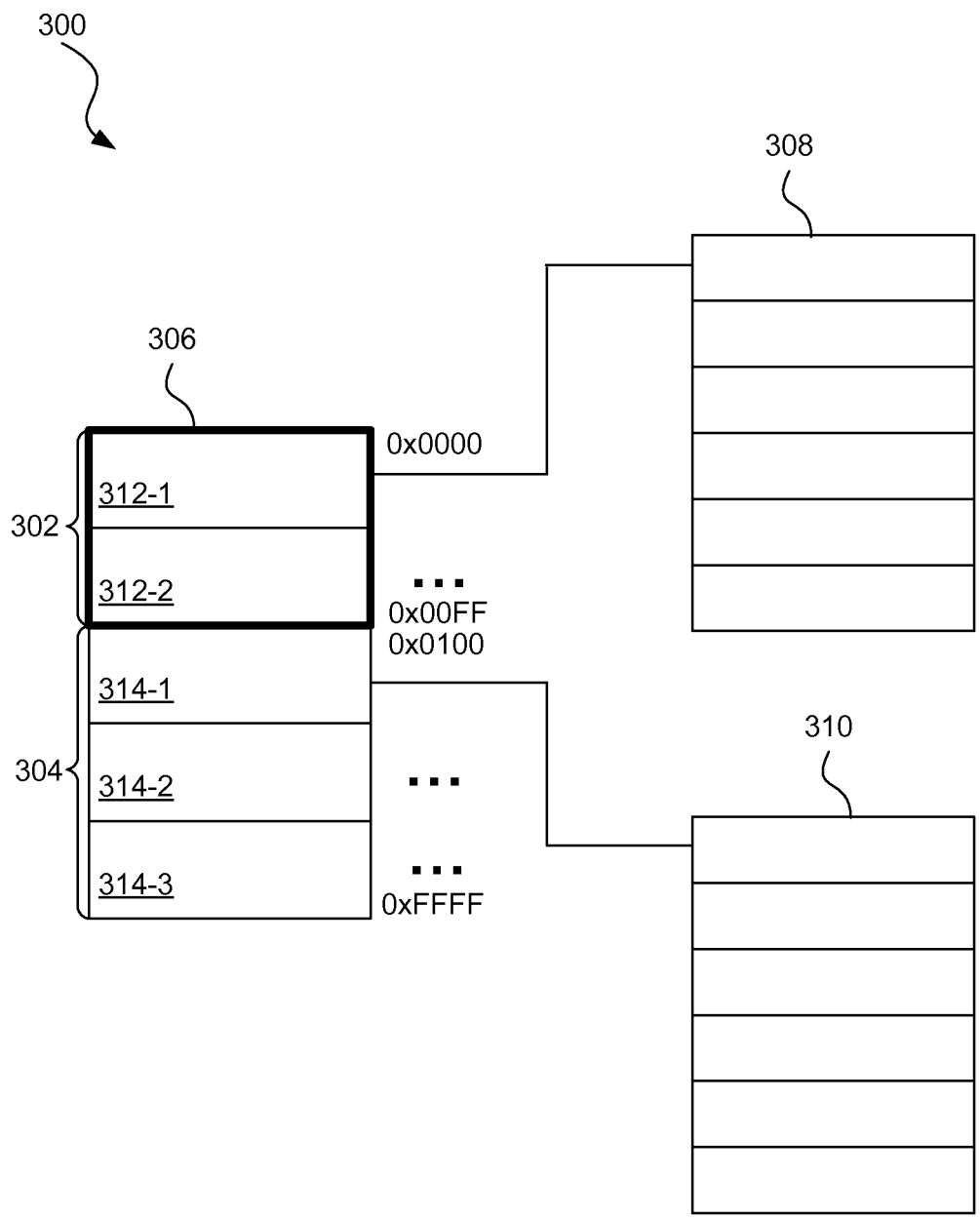
FIG. 3 is a diagram showing an illustrative multilevel page table that can be used with range based virtual machine functions, according to one example of principles described herein.

FIG. 3 is a diagram showing an illustrative multilevel page table 300 that can be used with range based virtual machine functions. As described above, a page table maps guest virtual addresses to guest physical addresses. In some cases, a page table may be relatively large and thus it is desirable not to store the entire thing in working memory. Thus, multilevel page tables may be used. In a multilevel page table, the highest level includes entries that correspond to smaller page tables. In a simplified example, a single level page table that includes 16 entries can be replaced with a multilevel page table in which the first level includes 4 entries, each entry representing 4 entries that have no mapping from guest virtual addresses to guest physical addresses or referring to a page table having four entries that map guest virtual addresses to guest physical addresses. Practical page table include a much larger number of entries on each level.

According to the present example, the multilevel guest page table 300 includes a page upper directory 306. The page upper directory 306 includes a dedicated set 302 of contiguous entries 312 that reference page tables 308 that map guest virtual addresses to memory addresses that correspond to privileged memory. For example, the first entry 312-1 maps to a first page table 308 that maps virtual addresses within a specific range to memory addresses that correspond to privileged memory. Likewise, the second entry 312-2 maps to another page table (not shown) that maps a subsequent and contiguous set of virtual memory addresses to memory addresses within privileged memory.

In this example, the total range of memory addresses for the set 302 of contiguous entries 312 is from memory address 0x0000 to 0x00FF. Thus, any virtual address within this memory address maps to privileged memory.

The page upper directory 306 also includes a set 304 of entries 314 that map virtual addresses to guest physical addresses that correspond to guest memory. For example, entry 314-1 maps to a page table 310 that maps virtual addresses to guest physical addresses corresponding to guest memory. Entries 314-2 and 314-3 also map to page tables (not shown) that map virtual addresses to guest physical addresses corresponding to guest memory.

While the present example illustrates a set 302 with only two contiguous entries 312, some examples may have only a single entry or more than two entries. In some cases, the set of contiguous entries may not necessarily be positioned at the top of the page upper directory. For example, the set of contiguous entries that map guest virtual addresses to privileged memory may be within a range of 0x00FF to 0x01FF. Any addresses outside that range will correspond to guest memory addresses.

Using a multilevel page table 300 as described in FIG. 3, a simple test can be used to validate a pointer. Specifically, if the pointer has a value that is within the range of addresses mapped to privileged memory, then it is known that such a pointer is not valid. If the pointer has a value that is outside the range of addresses mapped to privileged memory, then it is known that such a pointer references guest memory and is thus valid. Using the example of FIG. 3, a pointer value that is less than 0x00FF references an address within privileged memory and a pointer value that is greater than 0x00FF references an address within guest memory.

In some examples, instead of having a contiguous set of entries that map to privileged memory, there may be a set of contiguous entries that map to guest memory, and all memory addresses outside the range associated with the set of contiguous entries map to privileged memory. Thus, to ensure that a pointer references a virtual address that maps to guest memory, it is ensured that the pointer value is within the range of addresses associated with the set of contiguous entries corresponding to guest memory.

Figure 4:
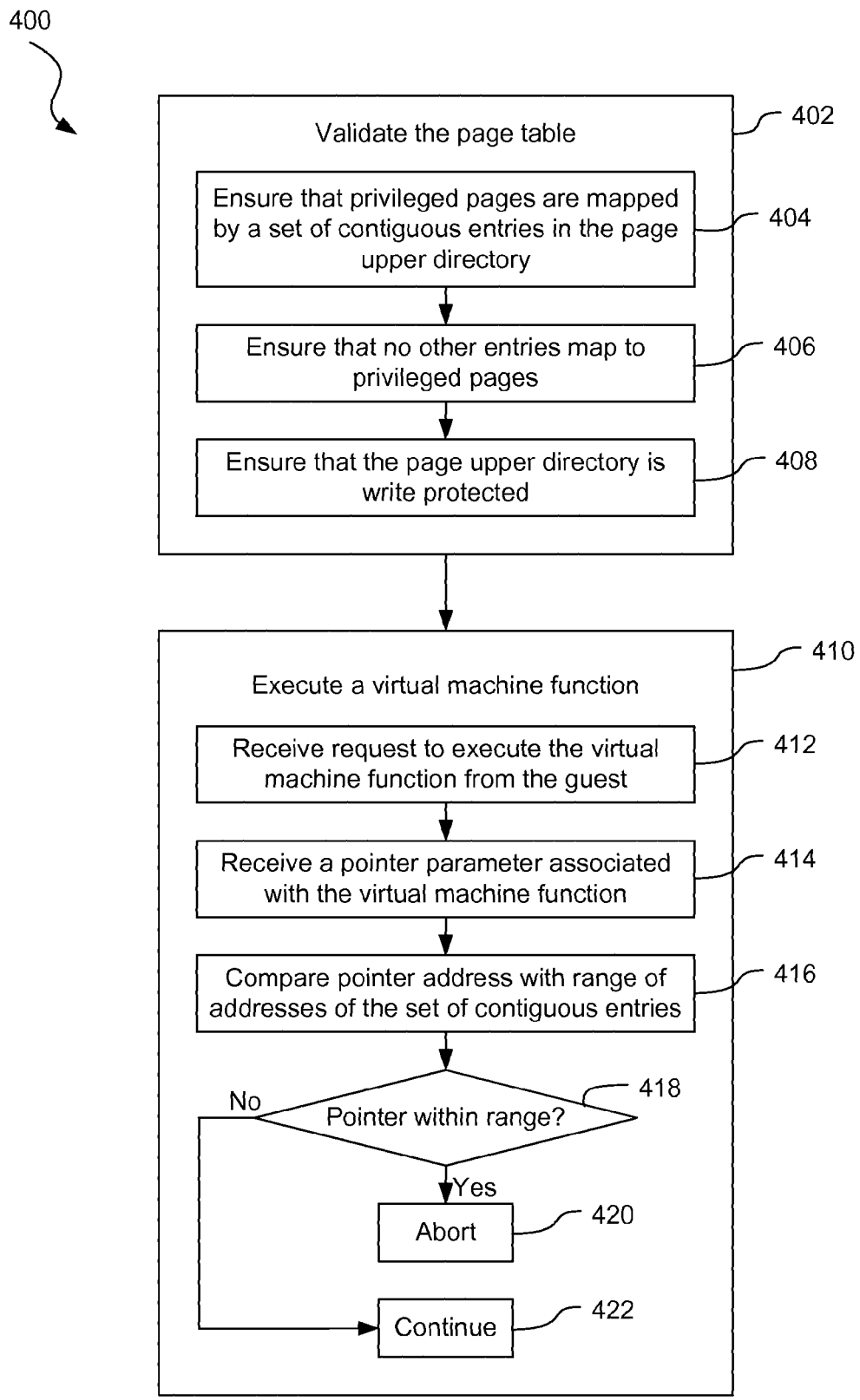
FIG. 4 is a flowchart showing an illustrative method for using range based virtual machine functions, according to one example of principles described herein.

FIG. 4 is a flowchart showing an illustrative method 400 for using range based virtual machine functions. According to the present example, the method 400 includes a step 402 for validating the multilevel page table. In some cases, the hypervisor can initiate the multilevel page table for the guest. In doing so, the hypervisor can ensure that the multilevel page table includes the desired properties as will be described in further detail below. In some cases, however, the guest can initiate the page table and then the hypervisor can validate the page table.

To validate the page table, the method 400 further includes a step 404 for determining that privileged pages are mapped by a set of contiguous entries in the page upper directory (e.g., 306, FIG. 3). The method 400 further includes a step 406 for determining that, within the multilevel page table, no other entries map to privileged pages. In other words, within the multilevel page table, only the entries within the set of contiguous entries map to the privileged pages. Thus, it is ensured that a virtual address within a particular range references an address within privileged memory and any virtual address outside that range references an address within guest memory.

The method 400 further includes a step 408 for ensuring that the page upper directory is write protected. Guest page tables are typically able to be manipulated by a guest for various reasons. In this case, however, it is desirable to write protect the page upper directory to prevent an untrusted guest from maliciously or erroneously modifying the page table so that a particular range of memory addresses does not necessarily correspond to privileged memory. In some examples, the guest is still able to modify the page tables referenced by entries within the page upper directory. Thus, the guest operating system may still have some control over the page table.

After the guest page table has been validated, the method 400 includes a step 410 for executing a virtual machine function. For example, the virtual machine hosting the guest may be executing a sequence of instructions stored within guest memory. Those instructions may include virtual machine functions. As described above in the text accompanying FIG. 2, instructions stored within the guest pages can include an instruction to jump to the trampoline code. The trampoline code then includes instructions to call the virtual machine function stored within the trusted pages. The virtual machine function includes executing the VMFUNC instruction to change the view.

According to the present example, to execute the virtual machine function, a request from the guest to execute the virtual machine function is received at step 412. Additionally, at step 414, a pointer parameter associated with the virtual machine function is received. In this example, the virtual machine function transfers data from privileged memory to guest memory. Thus, the pointer parameter references the location where data from privileged memory is to be stored in guest memory. For security purposes, it should be verified that the pointer references a location within guest memory and not privileged memory.

According to the present example, the method 400 further includes a step 416 for comparing the pointer address with the range of addresses associated with the set of contiguous entries. At step 418, it is determined whether the pointer value falls within a range of addresses that is mapped by entries within the set of contiguous entries. This can be done with much less computing resources than a page walk.

If it is determined that the pointer falls within the range of addresses associated with the set of contiguous entries that map virtual addresses to privileged memory, then the method proceeds to step 420 at which execution of the virtual machine is aborted. This is done because the pointer value is not a valid address to which data should be stored. If, however, the pointer is outside the range of addresses that map to privileged pages, then the method 400 proceeds to step 422 at which the virtual machine function can continue execution as normal.

Figure 5:
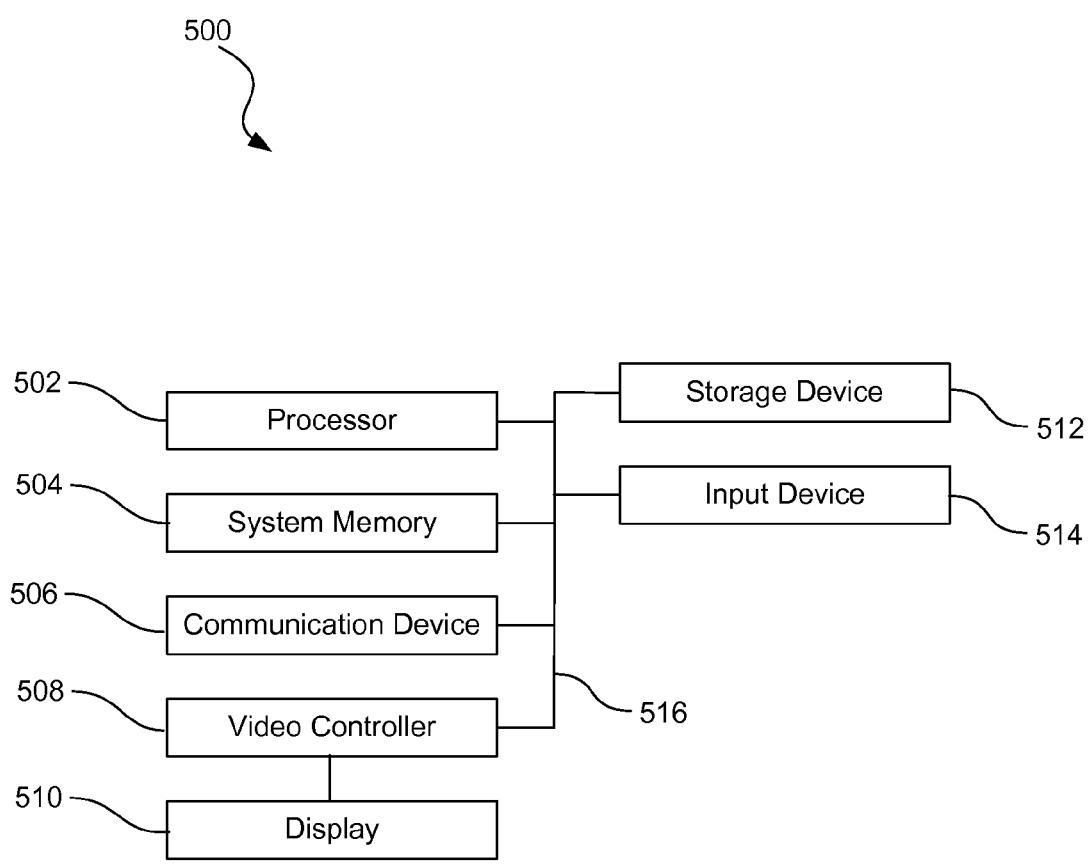
FIG. 5 is a diagram showing an illustrative computing system that can host virtual machines, according to one example of principles described herein.

FIG. 5 is a diagram of an illustrative computing system that may run several virtual machines and a hypervisor with functionality described herein. For example, the computing system 500 may include components of a server system that implements the methods 300 and 400 described above.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smart-phones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   with a hypervisor, determining that a multilevel guest page table includes an upper directory that maps a set of contiguous entries to privileged pages;
   with the hypervisor, determining that, within the multilevel page table, only the set of contiguous entries map to the privileged pages;
   with the hypervisor, receiving a request from the guest to execute a virtual machine function;
   receiving a pointer as a parameter for the virtual machine function; and
   in response to determining that the pointer references a memory address that is within a range associated with the set of contiguous entries, aborting the virtual machine function.

2. The method of claim 1, wherein the upper directory is not writable by the guest.

3. The method of claim 1, wherein lower levels of the multilevel guest page table are modifiable by the guest.

4. The method of claim 1, further comprising, in response to determining that the pointer references a memory address that is outside the range associated with the set of contiguous entries, continuing execution of the virtual machine function.

5. The method of claim 1, wherein the virtual machine function comprises transferring data from a guest page to one of the privileged pages.

6. The method of claim 5, wherein the pointer references a guest virtual address that maps to a guest physical address where the data is stored.

7. The method of claim 1, wherein the virtual machine function comprises transferring data from the privileged pages to a guest page.

8. The method of claim 7, wherein pointer references a guest virtual address that maps to a guest physical address where the data is to be stored.

9. The method of claim 1, wherein the hypervisor initiates the guest page table.

10. The method of claim 1, wherein the guest initiates the guest page table and the hypervisor validates the guest page table.

11. A method performed by a computing system, the method comprising,
creating a multilevel guest page table that maps guest virtual addresses to guest physical addresses;
mapping guest pages to a contiguous set of entries in a Page Upper Directory (PUD) of the multilevel page table;
mapping privileged pages to other entries within the PUD;
with the hypervisor, validating that all guest pages are mapped to the contiguous set of entries in the Page Upper Directory (PUD) of the multilevel page table;
executing a virtual machine function that passes a pointer as a parameter;
comparing the pointer to a range of memory addresses associated with the contiguous set of entries; and
in response to determining that the pointer references a memory address that is outside the range, aborting the virtual machine function.

12. The method of claim 11, wherein the PUD is write protected from the guest and lower levels of the multilevel guest page table are not write protected from the guest.

13. The method of claim 11, further comprising, in response to determining that the pointer references a memory address that is inside the range, continuing execution of the virtual machine function.

14. The method of claim 11, wherein the virtual machine function involves transferring data from a guest page to one of the privileged pages.

15. The method of claim 14, wherein the pointer references a guest virtual address that maps to a guest physical address where the data is stored.

16. The method of claim 11, wherein the virtual machine function involves transferring data from the privileged pages to a guest page.

17. The method of claim 16, wherein the pointer references a guest virtual address that maps to a guest physical address where the data is stored.

18. A system comprising:
a processor; and
memory comprising machine readable instructions that comprise a hypervisor configured to manage a number of guests, wherein the hypervisor is configured to:
determine that a multilevel guest page table includes an upper directory that maps a set of contiguous entries to privileged pages from a perspective of the guest;
determine that, within the multilevel page table, only the set of contiguous entries map to the privileged pages;
receive a request from the guest to execute a virtual machine function, the virtual machine function passing a pointer as a parameter;
compare a memory address referenced by the pointer to a range of memory addresses associated with the set of contiguous entries; and
in response to determining that the pointer references a memory address that is inside the range, abort the virtual machine function.

19. The system of claim 18, wherein the hypervisor is configured to initiate the multilevel page table.

20. The system of claim 18, wherein the guest is configured to initiate the multilevel page table and the hypervisor is configured to validate the multilevel page table.

* * * * *